Patented Apr. 8, 1952

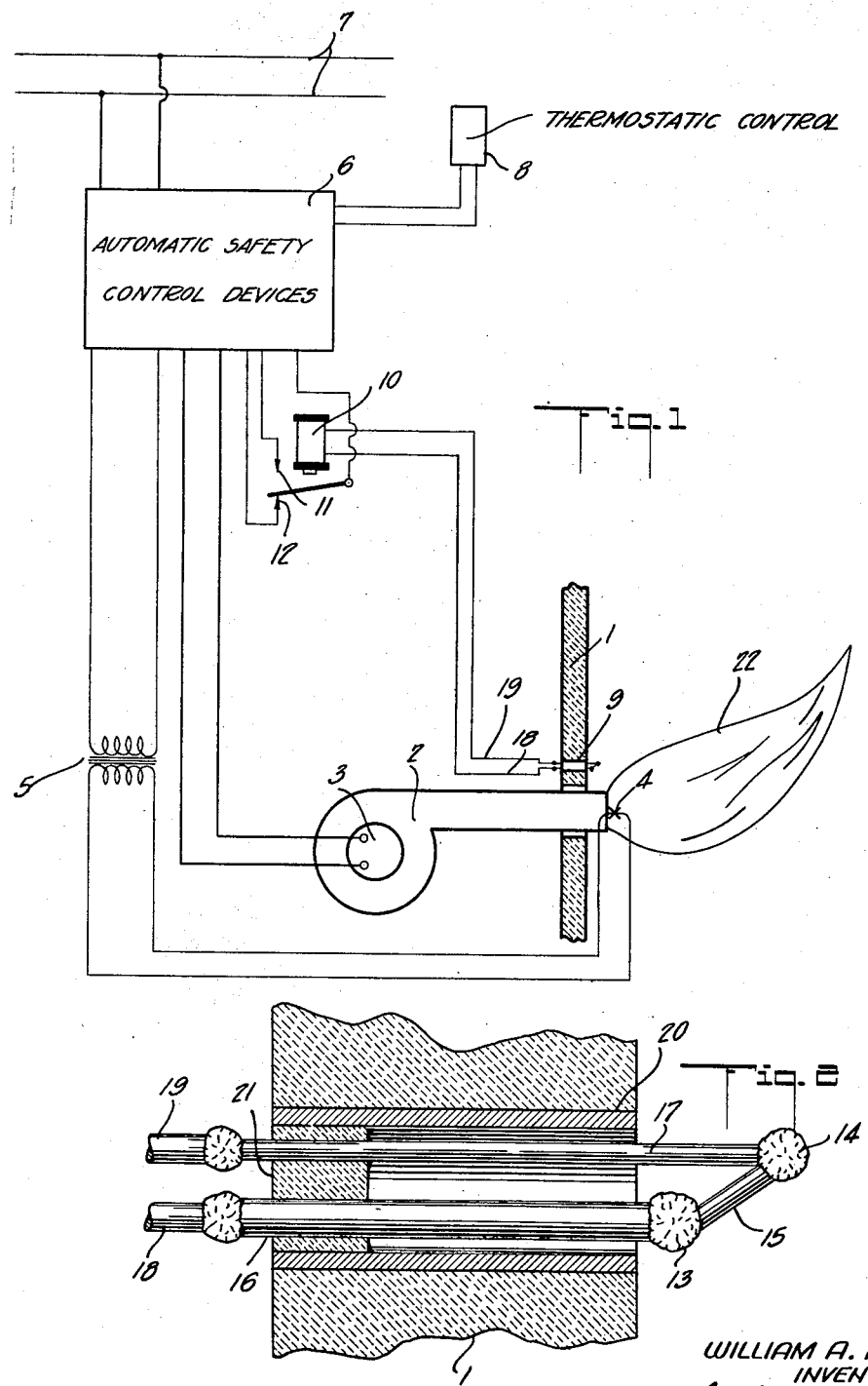

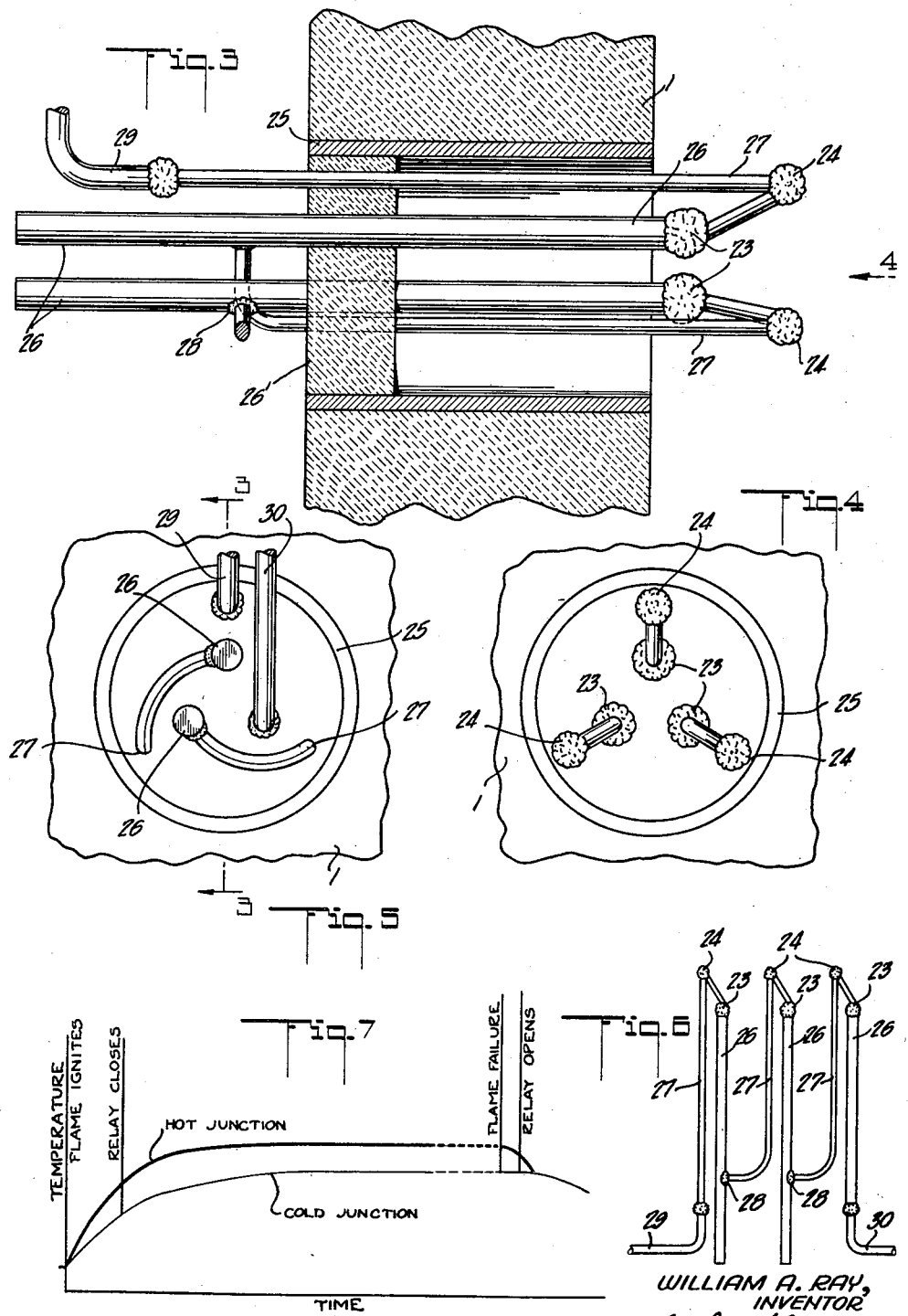

2,592,068

UNITED STATES PATENT OFFICE 2,592,068

OIL BURNER SAFETY CONTROL SYSTEM, INCLUDING A FLAME RESPONSIVE THERMOCOUPLE STRUCTURE

William A. Ray, North Hollywood, Calif., assignor to General Controls Co., a corporation of California Original application November 5, 1940, Serial No. 364,356, now Patent No. 2,466,274, dated April 5, 1949. Divided and this application July 19, 1948, Serial No. 39,477

5 Claims. (Cl. 158—28)

This invention relates to a system for controlling the operation of a fuel burner, as may be utilized for furnaces. An example of a system of this general character whereby it is assured that the supply of fuel will be discontinued and the igniting means deenergized in the event the burner fails for any reason, is shown in Patent No. 2,113,858, issued on April 12, 1938, in the name of William A. Ray, and entitled "Control Unit."

This application is a division of a prior application filed November 5, 1940, for Thermocouple Operated Control System, in the name of William A. Ray, and having Serial No. 364,356, now Patent No. 2,466,274.

The system necessarily includes a device responsive to a phase of operation of the burner for initiating a control function. Such a device is conveniently a thermocouple, exposed to the heat of the burner as by radiation, and generating an electric current for the operation of a relay or other control element.

It is one of the objects of this invention to improve the operation of such systems, especially by simplification of the thermocouple structure.

Such thermocouple structures necessarily include a pair of conductors of dissimilar metals, which are joined or fused together to form one or more "hot" junctions. When the temperature of the hot junctions suitably exceeds that of other junctions, between the conductors or in the thermocouple circuit, there is a generation of electrical energy in the circuit. All this is now well understood and no further explanation thereof is required.

In the event of flame failure (as of a main oil burner), it is essential that the thermocouple respond promptly to this condition, so that the fuel supply may be shut off and the system rendered inactive. By the aid of this invention, these effects are obtained, since the thermocouple junctions promptly assume substantially equal temperatures.

It is another object of this invention to simplify the thermocouple structure that may operate in this desired manner, when both the cold and hot junctions are subjected to the radiant heat of the flame and away from the flame. Appropriate temperature differential effects are obtained by properly positioning the conductors and junctions.

It has been suggested, as for example in the Patent No. 2,139,504, issued Dec. 6, 1938, to W. J. King, that a thermocouple structure might be used in which generation of the thermoelectric current occurs as a transient phenomenon. Thus the thermoelectric current flows for a limited interval when it is first subjected to the source of heat; and correspondingly, it flows for another limited interval upon making the source of heat inactive. These transient effects are intended to be utilized in the control apparatus described by King. While King also suggests a form of thermocouple mounting that is intended to maintain a constant temperature differential between the hot and cold junctions during operation of the furnace, the temperature differential in that case is stated to be due to the use of special means for facilitating heat transfer from the cold junctions.

It is accordingly another object of this invention to ensure that the thermocouple structure operates steadily to generate a current when the hot and cold junctions are exposed substantially equally to a source of heat, by the use of simple means for effecting a temperature difference between said junctions.

This invention possesses many other advantages, and has other objects which may be made more easily apparent from a consideration of several embodiments of the invention. For this purpose there are shown several forms in the drawings accompanying and forming part of the present specification. These forms will now be described in detail, illustrating the general principles of the invention; but it is to be understood that this detailed description is not to be taken in a limiting sense, since the scope of this invention is defined by the appended claims.

Referring to the drawings:

Figure 1 is a diagrammatic representation of a system incorporating the invention;

Fig. 2 is an enlarged sectional view, of a thermocouple structure utilized in the system of Fig. 1;

Fig. 3 is a sectional view, similar to Fig. 2, but illustrating a form of the invention in which a series of pairs of thermocouple junctions is utilized, the section being taken along the plane 3—3 of Fig. 5;

Fig. 4 is an end view, as seen in the direction of the arrow, from the right hand of Fig. 3;

Fig. 5 is an end view of the structure illustrated in Fig. 3 taken from the left hand end thereof;

Fig. 6 is a diagram illustrating the manner in which the multiple pairs of junctions may be connected together in series; and Fig. 7 is a graph exemplifying the operation of the control system when utilizing the invention.

In the forms shown in Figs. 1 and 2, the furnace wall 1 may serve to define a furnace space, in which fuel, for example oil in divided form, may be burned; however, other fuels, liquid, gaseous, or solid may be utilized. The supply of fuel into the furnace space is shown as provided by an oil burner structure 2 having a blower motor 3 therefor, and provided with vaporizing means. The burner flame 22 is shown as extending substantially horizontally, although in some instances it may take other positions. The ignition of the vaporized fuel is shown as being accomplished by an electric spark or ignition device 4 adjacent the oil burner opening. This ignition device 4 is shown as being supplied with energizing current at the proper electromotive force, from the secondary winding of a suitable transformer 5.

In the operation of oil burners that are intended to be under the control of a thermostat, it is quite essential to ensure that the burner 2 and the blower motor 3 will be shut down in the event that the fuel fails to ignite; and also in the event that after ignition, the flame fails for any reason. In this way, fuel waste is stopped and dangerous fire hazards are obviated. Furthermore, it is desired automatically to disconnect the igniting means 4 after the system is in full operation.

This general type of automatic control is known; one form thereof is illustrated in the prior patent to W. A. Ray hereinbefore referred to. The automatic safety control devices needed for such a system are indicated diagrammatically by the rectangle 6. The electrical energy for operating the control system and the blower motor 3 may be supplied from the mains 7.

The initiation of the operation of the oil burner 2 and its cessation are ordinarily determined by a thermostatic control device 8. This thermostatic controlling device may be located in any appropriate place the temperature of which it may be desired to control; for example, in the room of a dwelling or other building.

For suitably causing the operation of the automatic safety control devices, a temperature responsive device 9 is utilized, which is subjected to the heat of the burner flame and responds thereto. The heat of the burner flame causes the device 9 to become active; a relay 10 is thereupon energized and its front contact 11 is closed, whereby the automatic system 6 acts to disconnect the transformer 5 from its source of energy, thereby deenergizing the ignition device 4. In the position shown in Fig. 1, the relay 10 is unenergized, the back contact 12 being closed. This condition may exist at the start of the operation of the furnace. When the thermostatic control means 8 causes energization of the ignition device 4, the circuits completed by back contact 12 are such as temporarily to maintain the ignition circuit active. If after a short time the relay 10 is still unenergized, indicating a failure of the burner 2 to light, then the automatic safety control devices operate to shut down the system by deenergizing motor 3 and the ignition means 4.

On the other hand, if the burner 2 is ignited within a short period after thermostat 8 operates, the automatic system maintains motor 3 energized, but operates to deenergize the circuit of igniting means 4.

When the thermostat control device 8 is in such condition as to necessitate the shutting down of the oil burner 2, the automatic safety control devices 6 operate immediately to open the circuit for the motor 3 and to maintain the ignition circuit deenergized. In the event of flame failure also, the same results are obtained, due to the response of the device 9 to the lowered temperatures in the furnace chamber.

The thermal responsive device 9 is in the form of a thermocouple, and this thermocouple is of such character that it will generate a sufficient current to operate the relay 10 when the burner 2 is active. The structure of the thermocouple is shown to best advantage in Fig. 2.

The thermocouple device has a pair of junctions 13 and 14. These junctions are both subjected to the radiation from flame 22, as by being exposed within the furnace chamber. The thermocouple 9 may be placed as closely to the nozzle of burner 2 as desired, although this spacing is not critical, so long as the junctions are subjected to the intense radiation of the flame. The conductors forming these junctions are of such character, as will be hereinafter described, as steadily to maintain the temperature of the junction 14 suitably above the temperature of the cold junction 13, in spite of the fact that both junctions are subjected to the radiant heat of the flame, and that the system is operating in a state of equilibrium. How this effect is secured will now be described.

The cold junction 13 is formed by the fusion of a short conductor 15 to a terminal conductor 16. The hot junction 14 is formed by the fusion of the short conductor 15 with a conductor 17. Conductor 15 is made from a metal or alloy dissimilar from the metal or alloy of which conductors 16 and 17 are made. Thus for example, conductor 15 may be made from "Chromel," an alloy which can withstand quite high temperatures; and conductors 16 and 17 may be made from "Copel," which is also capable of withstanding high temperatures. In the arrangement illustrated, the junctions 13 and 14 are both exposed to the radiant heat of the flame temperatures; however, the temperature gradients (as may be determined, for example, by thermal conductivity of the conductors, or by the spatial relationship of the junctions to the flame), are purposely made such that the temperature of the hot junction 14 remains suitably elevated above that of cold junction 13. Such an effect may be obtained even when the thermal conductivities of the conductors 15, 16 and 17 are substantially equal; such a form will be described hereinafter.

In the form shown in Fig. 2, the mass of conductor 16 subjected to furnace temperatures is purposely made greater than that of conductor 17; for example by an increase in sectional area. Also, the junctions 13 and 14 are placed preferably quite closely together so that they may be substantially equally subjected to the heat of flame 22.

Due to the difference in mass of conductors 16 and 17, the furnace temperature adjacent the junction 13 is less than at junction 14 connected to the smaller mass 17. This is partly due to the more rapid withdrawal of heat from the surrounding heated gases through the mass 16 to the exterior of the chamber. The effect is enhanced by the normal greater temperature of the furnace chamber at the junction 14 which is purposely placed farther within the furnace chamber.

The intermediate "Chromel" conductor 15 is also of small sectional area, such as conductor 17, so as to retard transfer of heat by conduction from junction 14.

The choice of "Copel" for the end conductors 16 and 17 and of "Chromel" for the intermediate conductor 15 is made purposely; "Copel" has greater electrical and thermal conductivity than "Chromel"; and therefore a more pronounced inequality in the temperatures at the junctions is obtained.

The conductors 16 and 17 may be joined to the leads 18 and 19, connecting the thermocouple 9 to the relay 10 in any appropriate manner. The coil of relay 10 thus completes the thermocouple circuit. The connection between conductors 16 and 18, and the connection between conductors 17 and 19 have no appreciable effect upon the operation of the thermocouple, since the thermoelectric junctions thus formed produce substantially equal but opposing electromotive forces.

A practical embodiment of the invention may be made in which conductors 15 and 17 are of No. 18 gauge wire; and conductor 16 is of No. 12 gauge wire. The lead-in wires 18 and 19 may be of No. 14 gauge copper wire. The element 15 between the junctions may have a length of the order of $\frac{1}{16}$ inch.

One manner in which the thermocouple structure may be supported by the wall 1 is indicated in Fig. 2. Thus a tube lining 20 may be provided for an aperture through the wall 1. Through this aperture the conductors 16 and 17 extend. These conductors may be supported in spaced relation in the tube 20, as by the aid of a refractory plug 21, through which the conductors 16 and 17 pass. This plug structure 21 may be appropriately supported, as by an adherent, in the interior of the tube 20. The space in lining 20 that is not occupied by the conductors 16 and 17 and block 21 is in communication with the furnace chamber and the heated gases therein.

The mode of operation of the system may now be summarized. For this purpose reference may be had to Fig. 7. Assuming that the furnace is started from a cold condition, and that thermostat 8 operates to permit the automatic system to go into action, the burner 2 and ignition means 4 are operated. As soon as the flame 22 ignites, the temperature of junction 14 rises steeply until a constant temperature is attained. This may take a matter of seconds. The temperature of junction 13 meanwhile rises more slowly. During this transient period, a sufficient temperature difference is obtained to energize relay 10; and front contact 11 of relay 10 is active. The ignition means 4 is deenergized. The junction 13 assumes an equilibrium temperature below that of junction 14. While this temperature difference is not as great as required to operate relay 10, yet it is ample to ensure against dropping out of the relay.

After the furnace is in operation for a while, the thermostat 8 may return to a position in which the burner 2 should be rendered inactive; or there may be a flame failure. Under such circumstances the safety devices are operated to deenergize the motor 2.

Now in the event of a flame extinguishment, the thermocouple structure 9 reacts quickly to return the system to an inactive condition. This quick reaction follows a reduction in the temperature in the furnace chamber, and just as soon as the flame no longer acts to transmit heat to the thermocouple junctions. Under such circumstances, the flow of heat to the thermocouple junctions is stopped; the heat stored in conductors 15, 16 and 17 causes a prompt equalization of the junction temperatures by an equalizing flow. This point is illustrated by the conjunction of the hot and cold junctions temperature graphs at the right hand portion of Fig. 7. The hot junction rapidly loses heat, the cold junction more slowly. The heated walls of the furnace do not interfere with this equalization as the heat effect of the walls is not comparable with that of the flame 22, which is the predominating factor in transmitting heat to the thermocouple structure.

By employing a sufficiently sensitive relay 10, a single pair of thermocouple junctions 13 and 14 is sufficient to close the relay at the beginning of flame operation and to maintain the relay closed until the flame 22 fails or is otherwise extinguished. It has been found that as much as six or seven millivolts may be produced by the thermocouple structure during equilibrium conditions. When the resistance of the complete load circuit is of the order of 0.060 ohm, the power thus produced is 0.6 milliwatt. It has been found that when the flame 22 is extinguished, the voltage across the terminals of relay 10 drops in a few seconds to releasing value, as illustrated by the point in the diagram of Fig. 7 labeled: "relay opens."

However, in some instances it may be desirable to multiply the thermoelectric current, as by using a plurality of thermocouples in series. Such an arrangement is illustrated in Figs. 3 to 6 inclusive.

Thus, instead of having a single pair of thermocouple junctions, there are three such pairs. Each of the pairs has a cold junction 23 and a hot junction 24, made substantially identically with the construction illustrated in Fig. 2. The three pairs of thermocouple junctions 23, 24, may be arranged equi-angularly about the axis of the enveloping tube 25. The plug 26', corresponding to plug 21 of Fig. 2, is adapted to be retained in any suitable manner within the tube 25.

The conductors 26 leading from the cold junctions 23, and the conductors 27 leading from the hot junctions 24, pass outwardly through the wall 1, and may be connected in series arrangement in the manner illustrated in Fig. 6. Thus two of the conductors 27 may be joined, as by welding or fusing, to points 28 upon two of the large conductors 26. The third of the large conductors 26, and the third of the small conductors 27 act as the terminals of the thermocouple structure. To these terminal conductors, may be fused the copper conductors 29 and 30.

The mode of operation of the multiple thermocouple structure is substantially identical with that described in connection with Fig. 2. All of the thermocouple junctions 23 and 24 are substantially uniformly exposed to the heat of the flame 22. This flame 22 is the predominant factor in transferring heat to the thermocouple junctions. Due to the fact that the conductors 26 reduce the temperature of the heated gases to a greater extent than the conductors 27, and can conduct heat at an increased rate, as compared with conductors 27, the temperature of junctions 23 are steadily maintained suitably below the temperatures of the corresponding junctions 24. The electromotive forces produced at the hot junction are additive by the series connections illustrated in Fig. 6.

I claim:

1. In a furnace system: wall means defining a furnace chamber; a burner communicating with said chamber; means for supplying fuel to said burner for burning as a flame; and means for controlling said fuel supplying means, including a thermocouple structure comprising a pair of conductors extending through said chamber wall and into said furnace chamber; means carried by said furnace chamber wall for mounting said conductors so that the inner ends of said conductors project only slightly into said chamber and lie closely adjacent said wall and to each other such that said inner ends will be substantially equidistant from said burner flame, and the other ends of said conductors project exteriorly of said wall; said burner being arranged to direct the fuel so as normally not to reach said inner ends; a metal element joining the said inner ends of said conductors, said metal element forming with said joining inner ends a pair of junctions and said metal element being thermoelectrically dissimilar from the conductors which it respectively joins, said conductors each being of substantially the same material and length, but one of said conductors having a greater cross sectional area than the other of said conductors, such that heat is dissipated dissimilarly from said conductors to said mounting means, said chamber wall, and the exterior of said chamber forming means, in order to maintain one of said junctions at a lower temperature than the other of said junctions.

2. In a furnace system: wall means defining a furnace chamber; a burner communicating with said chamber; means for supplying fuel to said burner for burning as a flame; and means for controlling said fuel supplying means, including a thermocouple structure comprising a pair of conductors extending through said chamber wall and into said furnace chamber; means carried by said furnace chamber wall for mounting said conductors so that the inner ends of said conductors project only slightly into said chamber and lie closely adjacent said wall and to each other such that said inner ends will be substantially equidistant from said burner flame, and the other ends of said conductors project exteriorly of said wall; said burner being arranged to direct the fuel so as normally not to reach said inner ends; a metal element joining the said inner ends of said conductors, said metal element forming with said joining inner ends a pair of junctions and said metal element being thermoelectrically dissimilar from the conductors which it respectively joins; a pair of connections respectively joined to the exterior ends of said conductors, said connections being less thermoelectrically dissimilar with respect to said conductors than is said metal element, said conductors each being of substantially the same material and length, but one of said conductors having a greater cross sectional area than the other of said conductors, such that heat is dissipated dissimilarly from said conductors to said mounting means, said chamber wall, and the exterior of said chamber forming means, in order to maintain one of said junctions at a lower temperature than the other of said junctions.

3. In a furnace system: wall means defining a furnace chamber; a burner communicating with said chamber; means for supplying fuel to said burner for burning as a flame; and means for controlling said fuel supplying means, including a thermocouple structure comprising a pair of conductors extending through said chamber wall and into said furnace chamber; means carried by said furnace chamber wall for mounting said conductors so that the inner ends of said conductors project only slightly into said chamber and lie closely adjacent said wall and to each other such that said inner ends will be substantially equidistant from said burner flame, and the other ends of said conductors project exteriorly of said wall; said burner being arranged to direct the fuel so as normally not to reach said inner ends; a metal element joining the said inner ends of said conductors, said metal element forming with said joining inner ends a pair of junctions and said metal element being thermoelectrically dissimilar from the conductors which it respectively joins; a pair of connections respectively joined to the exterior ends of said conductors, said connections being less thermoelectrically dissimilar with respect to said conductors than is said metal element, said conductors each being of substantially the same material and length, but one of said conductors having a mass greater than the other of said conductors, such that heat is dissipated dissimilarly from said conductors to said mounting means, said chamber wall, and the exterior of said chamber forming means, in order to maintain one of said junctions at a lower temperature than the other of said junctions.

4. In a furnace system: wall means defining a furnace chamber; a burner communicating with said chamber; means for supplying fuel to said burner for burning as a flame; and means for controlling said fuel supplying means, including a thermocouple structure comprising a plurality of pairs of conductors extending through said chamber wall and into said furnace chamber; means carried by said furnace chamber wall for mounting said conductors so that the inner ends of said conductors project only slightly into said chamber and lie closely adjacent said wall and to each other such that said inner ends will be substantially equidistant from said burner flame, and the other ends of said conductors projecting exteriorly of said wall; said burner being arranged to direct the fuel so as normally not to reach said inner ends, a plurality of metal elements joining the said inner ends of the pairs of conductors respectively, said metal elements forming with said joining inner ends a series of pairs of junctions, and said metal element being thermoelectrically dissimilar from the conductors which they respectively join, said conductors being joined at the exterior ends so that, together with said metal elements, said conductors are in series relationship, and a pair of connections respectively joined to the end conductors in the said series arrangement exterior of said chamber forming means, said connections being less thermoelectrically dissimilar with respect to said conductors than are said metal elements, said conductors all being of similar material, but alternate conductors in said series relation having a greater cross sectional area than the other alternate conductors, such that heat is dissipated dissimilarly from alternate conductors to said mounting means, said chamber wall, and the exterior of said chamber forming means, in order to maintain one of the junctions in each of said pairs of junctions at a lower temperature than the other of the junctions in each of said pairs of junctions.

5. In a furnace system: wall means defining a furnace chamber; a burner communicating with said chamber having an opening for the passage of fuel; means for supplying fuel to said burner for burning as a flame; and means for controlling said fuel supplying means including a thermocouple structure comprising a pair of conductors of substantially similar material extending through said chamber wall and into said furnace chamber; means carried by said wall for mounting said conductors so that the inner ends of said conductors project only slightly into said chamber and lie closely adjacent said wall and to each other such that the inner ends will be substantially equidistant from said burner flame, and the other ends of said conductors projecting exteriorly of said chamber forming means, said burner being arranged to direct the fuel so as normally not to reach said inner ends; a metal element joining the said inner ends of said conductors, said metal element forming with said joining inner ends a pair of junctions and said metal element being thermoelectrically dissimilar from the conductors which it respectively joins, and a pair of connections respectively joined to the exterior ends of said conductors, said connections being less thermoelectrically dissimilar with respect to said conductors than is said metal element.

WILLIAM A. RAY.

REFERENCES CITED

The following references are of record in the file of this patent:

UNITED STATES PATENTS

| Number    | Name      | Date          |
|-----------|-----------|---------------|
| 2,113,858 | Ray       | Apr. 12, 1938 |
| 2,139,504 | King      | Dec. 6, 1938  |
| 2,156,235 | Betz et al. | Apr. 25, 1939 |
| 2,193,516 | Laing     | Mar. 12, 1940 |
| 2,304,489 | Wetzel    | Dec. 8, 1942  |
| 2,466,274 | Ray       | Apr. 5, 1949  |

FOREIGN PATENTS

| Number  | Country       | Date         |
|---------|---------------|--------------|
| 351,712 | Great Britain | July 2, 1931 |